United States Patent
Netzer et al.

(10) Patent No.: US 12,185,439 B2
(45) Date of Patent: Dec. 31, 2024

(54) PRIMARY SIDE SWITCHED CONVERTER FOR PROVIDING A VOLTAGE SUPPLY TO AN LED LOAD

(71) Applicant: Tridonic GmbH & Co KG, Dornbirn (AT)

(72) Inventors: Harald Netzer, Nenzing (AT); Stefan Stark, Muntlix (AT)

(73) Assignee: Tridonic GmbH & Co KG, Dornbirn (AT)

(*) Notice: Subject to any disclaimer, the term of this patent is extended or adjusted under 35 U.S.C. 154(b) by 77 days.

(21) Appl. No.: 17/796,695

(22) PCT Filed: Mar. 22, 2021

(86) PCT No.: PCT/EP2021/057293
§ 371 (c)(1),
(2) Date: Aug. 1, 2022

(87) PCT Pub. No.: WO2021/197902
PCT Pub. Date: Oct. 7, 2021

(65) Prior Publication Data
US 2023/0053639 A1    Feb. 23, 2023

(30) Foreign Application Priority Data
Mar. 31, 2020  (EP) .................... 20167028

(51) Int. Cl.
*H02M 1/32*    (2007.01)
*H02M 1/00*    (2006.01)
(Continued)

(52) U.S. Cl.
CPC .......... *H05B 45/50* (2020.01); *H02M 1/0009* (2021.05); *H02M 1/32* (2013.01);
(Continued)

(58) Field of Classification Search
CPC ...... H05B 45/50; H05B 45/10; H05B 45/382; H05B 45/39; H02M 1/0009; H02M 1/32; H02M 3/33571
See application file for complete search history.

(56) References Cited

U.S. PATENT DOCUMENTS

2012/0091894 A1* 4/2012 Chuang ................ F21V 23/02
                                                      315/291
2014/0195065 A1  7/2014 Yang
(Continued)

FOREIGN PATENT DOCUMENTS

WO    2015121011    8/2015

OTHER PUBLICATIONS

PCT/EP2021/057293, International Search Report and Written Opinion, May 28, 2021, 9 pages.

*Primary Examiner* — Seokjin Kim
(74) *Attorney, Agent, or Firm* — Andrus Intellectual Property Law, LLP

(57) ABSTRACT

The invention relates to a method (100) for operating an isolated primary side switched converter (300) for providing a voltage supply to an LED load (401), wherein the converter comprises a galvanic isolation stage (301), the method comprising the steps of:
  detecting (101) a feedback signal at a primary side of the galvanic isolation stage (301), wherein the feedback signal corresponds to a secondary side voltage,
  determining (103) an LED supply voltage based on the feedback signal,
  calculating (105) a threshold value based on a constant reference voltage and an adjustment factor, wherein the adjustment factor is a dynamic factor whose absolute value increases with increasing LED current, and
(Continued)

interrupting (107) the voltage supply to the LED load (401) if the determined LED supply voltage exceeds the threshold value.

13 Claims, 7 Drawing Sheets

(51) Int. Cl.
*H02M 3/335* (2006.01)
*H05B 45/10* (2020.01)
*H05B 45/382* (2020.01)
*H05B 45/50* (2022.01)

(52) U.S. Cl.
CPC ........ *H02M 3/33571* (2021.05); *H05B 45/10* (2020.01); *H05B 45/382* (2020.01)

(56) References Cited

U.S. PATENT DOCUMENTS

| | | | |
|---|---|---|---|
| 2015/0145437 A1* | 5/2015 | Limmer | H05B 45/14 |
| | | | 315/297 |
| 2015/0312986 A1 | 10/2015 | Wayne et al. | |
| 2016/0241016 A1 | 8/2016 | Dibyendu et al. | |
| 2018/0115174 A1* | 4/2018 | Fahlenkamp | H02J 7/02 |

\* cited by examiner

PRIMARY SIDE SWITCHED CONVERTER FOR PROVIDING A VOLTAGE SUPPLY TO AN LED LOAD

CROSS REFERENCE TO RELATED APPLICATIONS

The present application is the U.S. national stage application of international application PCT/EP2021/057293 filed Mar. 22, 2021, which international application was published on Oct. 7, 2021 as International Publication WO 2021/197902 A1. The international application claims priority to European Patent Application No. 20167028.8 filed Mar. 31, 2020.

TECHNICAL FIELD OF THE INVENTION

The invention relates to converters for light sources, in particular LEDs. In particular, the invention relates to a method for operating a primary side switched converter for providing a voltage supply to an LED load, as well as an isolated primary side switched converter and a driver for light sources comprising such a converter.

BACKGROUND OF THE INVENTION

Converters can be used as DC/DC stages in LED drivers for supplying an LED load with a regulated output voltage. An example for such a converter is a primary side switched converter.

Primary side switched converters generally comprise a transformer which is arranged between a primary and a secondary side of the converter, wherein both sides are galvanically isolated from each other, and wherein the primary side comprises at least one switch. A half bridge LLC converter is an example for such a converter.

It is usually important to ensure that the output voltage of such an LED converter does not exceed a threshold value of, for instance, 60 volts. This threshold value is prescribed by a corresponding standard for low level operation of LEDs, since a user may accidentally touch the normally unprotected lines.

The output voltage of such converters can be sensed via magnetic coupling to a secondary side winding of the converter. If it is detected, that the voltage reaches a threshold value the LED converter shuts down.

However, the determination of the output voltage of such a converter can be subject to certain fluctuations or tolerances. Such fluctuations can be linked to the magnetic behavior, in particular leakage flux, or a current depending voltage drop of the output rectification and output filter of the LED converter, and can be caused by a number of external and internal factors.

To make sure that the threshold value is never exceeded, the drivers are designed in such a way that the voltage supply of the LEDs is already switched off if the output voltage reaches a shutdown level below the 60 volt threshold, e.g. at 50 volts. However, due to this limitation the converter cannot provide a supply voltage near the 60 volt threshold.

Thus, it is an objective of the invention to provide an improved primary side switched converter, an improved driver comprising such a converter and an improved method for operating a primary side switched converter, which avoid the above-mentioned disadvantages. In particular, it is the object of the invention to provide an isolated primary side switched converter, which allows an efficient compensation of deviations of the determined output voltage.

SUMMARY OF THE INVENTION

The object of the present invention is achieved by the solution provided in the enclosed independent claims. Advantageous implementations of the present invention are further defined in the dependent claims.

According to a first aspect, the invention relates to a method for operating an isolated primary side switched converter for providing a voltage supply to an LED load, wherein the converter comprises a galvanic isolation stage, the method comprising the steps of:
detecting a feedback signal at a primary side of the galvanic isolation stage, wherein the feedback signal corresponds to a secondary side voltage,
determining an LED supply voltage based on the feedback signal,
calculating a threshold value based on a constant reference voltage and an adjustment factor, wherein the adjustment factor is a dynamic factor whose absolute value increases with increasing LED current, and
interrupting the voltage supply to the LED load if the determined LED supply voltage exceeds the threshold value.

This achieves the advantage that current depending deviations of the calculated LED supply voltage can be compensated efficiently. In particular, these deviations are considered when determining the threshold voltage at which the converter is shut off. Thus, a higher output voltage, e.g. 54V, can be provided without risking that the voltage exceeds a maximal value of 60V.

The converter can be a resonant or hard switched converter. In particular, the converter is one of the following types: LCC, flyback, or synchronous flyback.

The converter can comprise a switching network on the primary side of the galvanic isolation stage. The switching network can comprise two or four switches.

The converter can be a DC/DC stage for supplying the LED load with a regulated output voltage. In particular, the secondary side voltage corresponds to the output voltage.

The adjustment factor is either a positive voltage value, which increases with increasing LED current, or a negative voltage value, which further decreases with increasing LED current.

The threshold value represents a threshold voltage for supplying the LEDs. In particular, the converter is configured to interrupt the voltage supply of the LED load as soon as the LED supply voltage reaches the threshold value.

The LED supply voltage can be determined by passing the feedback signal through a voltage divider and/or transforming the feedback signal to a digital voltage signal.

The LED current can be detected by a current sensing unit of the converter. The current sensing unit can comprise a further auxiliary winding on the primary side of the galvanic isolation stage that is magnetically coupled to at least one secondary side winding.

The LED load can comprise an LED module, an LED luminaire and/or an LED track.

In an embodiment, the adjustment factor comprises a constant term and a dynamic term that is dependent on the LED current. This achieves the advantage that current depending deviations in the determined output voltage can be compensated efficiently.

In an embodiment, the adjustment factor comprises a linear function of the LED current.

For instance, the threshold value ($V_{ref,comp}$) is calculated according to the following equation:

$$V_{ref,comp} = V_{ref}(I_{LED}*x_1) + x_2,$$

with $V_{ref}$ being the reference voltage and $(I_{LED}*x_1)+x_2$ being the adjustment factor, wherein $I_{LED}$ is the LED current and $x_1$ and $x_2$ are constant correction parameters.

In an embodiment, the linear function is determined by performing at least two calibration measurements at different LED currents. This provides the advantage that the adjustment factor can take device specific deviations into account.

For instance, the calibration measurements can comprise driving the converter at two different loads, i.e. at two different currents, and measuring the offset of the output voltage at each current. By fitting a linear regression to the two measurement points the correction parameters $x_1$ and $x_2$ can be determined.

Alternatively, the adjustment factor may comprise a higher order function of the LED current.

In an embodiment, the adjustment factor comprises a temperature dependent part. This achieves the advantage that temperature depending deviations in the determined output voltage can be compensated efficiently.

The temperature can correspond to an ambient temperature, in particular a temperature close to or at the LED load.

In an embodiment, the temperature dependent part is a linear or higher order function of the temperature, or wherein the temperature dependent part is determined based on a look-up-table. This achieves the advantage that temperature depending deviations in the determined output voltage can be compensated efficiently.

The look-up-table can be stored in a memory of the converter, in particular a memory of an ASIC or microcontroller of the converter.

For instance, the threshold value ($V_{ref,comp}$) is calculated according to the following equation:

$$V_{ref,comp} = V_{ref}(I_{LED}*x_1) + x_2 + x(T),$$

wherein x(T) is the temperature dependent part. In particular, T(X) is a linear equation, such as $x(T)=x*T$, with T being the temperature and x being a constant factor.

In an embodiment, the adjustment factor depends on a dimming level of the LED load.

According to a second aspect, the invention relates to an isolated primary side switched converter for providing a voltage supply to an LED load, comprising a galvanic isolation stage, an auxiliary winding on the primary side of the galvanic isolation stage which is magnetically coupled to at least one secondary side winding, wherein the auxiliary winding is configured to receive a feedback signal corresponding to a secondary side voltage, a control unit configured to determine an LED supply voltage based on the feedback signal, a processing unit configured to calculate a threshold value based on a constant reference voltage and an adjustment factor, wherein the adjustment factor is a dynamic factor whose absolute value increases with increasing LED current, and wherein the converter is configured to interrupt the voltage supply to the LED load if the determined LED supply voltage exceeds the threshold value.

This achieves the advantage that current depending deviations of the calculated LED supply voltage can be compensated efficiently. In particular, these deviations are considered when determining the threshold voltage at which the converter is shut off. Thus, a higher output voltage, e.g. 54V, can be provided without risking that the voltage exceeds a maximal value of 60V.

The isolated primary side switched converter can be an LLC converter, in particular an LLC resonant half bridge converter, a flyback converter or a synchronous flyback converter. The converter can comprise a switching network on the primary side of the galvanic isolation stage. The switching network can comprise two or four switches.

The converter can be a DC/DC stage for supplying the LED load with a regulated output voltage. In particular, the secondary side voltage corresponds to the output voltage.

The adjustment factor is either a positive voltage value, which increases with increasing LED current, or a negative voltage value, which further decreases with increasing LED current.

The threshold value represents a threshold voltage for supplying the LEDs. In particular, the converter is configured to interrupt the voltage supply of the LED load as soon as the LED supply voltage reaches the threshold value.

The LED supply voltage can be determined by passing the feedback signal through a voltage divider and/or transforming the feedback signal to a digital voltage signal via the control unit.

The LED load can comprise an LED module, an LED luminaire and/or an LED track.

In an embodiment, the converter comprises a current sensing unit, which is configured to detect the LED current.

In an embodiment, the current sensing unit comprises a further auxiliary winding on the primary side of the galvanic isolation stage, which is magnetically coupled to at least one further secondary side winding. This achieves the advantage that the LED current can be detected efficiently for calculating the threshold value.

In an embodiment, the converter comprises a temperature sensing unit for sensing an ambient temperature, wherein the adjustment factor comprises a temperature dependent part. This achieves the advantage that temperature depending deviations in the output voltage can be compensated efficiently.

In particular, the temperature calculated is configured to sense the temperature close to or at the LED load.

In an embodiment, the temperature sensing unit is arranged at the LED load and is connected to the processing unit via a communication interface, in particular a DALI or a Bluetooth interface. This achieves the advantage that the temperature can be detected efficiently for calculating the threshold value.

In an embodiment, the control unit is configured to control at least one primary side switch of the converter.

In an embodiment, the control unit is configured to interrupt the voltage supply to the LED load if the calculated output voltage exceeds the threshold value. This achieves the advantage, that the voltage supply to the LED load can be interrupted promptly, as soon as the voltage exceeds the threshold value.

In particular, the control unit interrupts the voltage supply to the LED load by shutting down the converter, e.g. by controlling the primary side switches of the converter to interrupt the voltage supply to the LED load.

In an embodiment, the control unit comprises an ASIC and/or the processing unit comprises a microcontroller.

Alternatively, the control unit and the processing unit can be integrated in the same unit, e.g. a single microcontroller or ASIC.

The converter can be adapted to perform the method according to the first aspect of the invention.

According to a third aspect, the invention relates to a driver for light sources, in particular LEDs, comprising the isolated primary side switched converter according to the second aspect of the invention.

The driver can be an LED converter for converting an AC mains voltage to a voltage suitable for driving an LED load.

The converter can be a DC/DC stage of the driver. The driver can further comprise an AC/DC stage for supplying the converter with a DC input voltage.

The driver can be an SELV (safety extra-low voltage) device.

BRIEF DESCRIPTION OF THE DRAWINGS

The invention will be explained in the followings together with the figures.

DETAILED DESCRIPTION OF THE PREFERRED EMBODIMENTS

Figure 1:
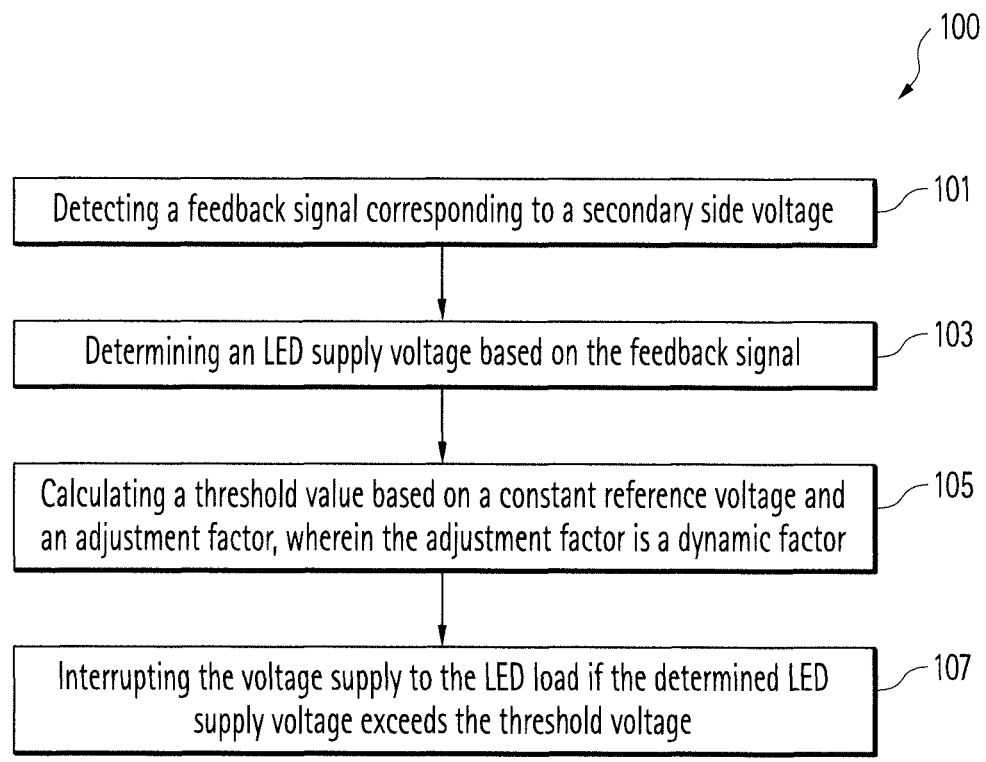
FIG. 1 shows a schematic diagram of a method for operating an isolated primary side switched converter according to an embodiment.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various aspects of a converter will be presented. However, as those skilled in the art will readily appreciate, these aspects may be extended to aspects of an driver for light sources without departing from the invention.

The term "LED luminaire" shall mean a luminaire with a light source comprising one or more LEDs. LEDs are well-known in the art, and therefore, will only briefly be discussed to provide a complete description of the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

FIG. 1 shows a schematic diagram of a method 100 for operating an isolated primary side switched converter for providing a voltage supply to an LED load according to an embodiment.

The method 100 comprises the steps of: detecting 101 a feedback signal at a primary side of the galvanic isolation stage, wherein the feedback signal corresponds to a secondary side voltage, determining 103 an LED supply voltage based on the feedback signal, calculating 105 a threshold value based on a constant reference voltage and an adjustment factor, wherein the adjustment factor is a dynamic factor whose absolute value increases with increasing LED current, and interrupting 107 the voltage supply to the LED load if the feedback signal exceeds the threshold value.

The LED supply voltage can be determined 103 by passing the feedback signal through a voltage divider and/or transforming the feedback signal to a digital voltage signal.

The adjustment factor can comprise a constant term and a dynamic term that is dependent on the LED current. In particular, the adjustment factor comprises a linear function of the LED current.

For instance, the threshold value ($V_{ref,comp}$) is calculated according to the following equation:

$$V_{ref,comp} = V_{ref}(I_{LED}*x_1) + x_2,$$

with $V_{ref}$ being the reference voltage and $(I_{LED}*x_1)+x_2$ being the adjustment factor, wherein $I_{LED}$ is the LED current and $x_1$ and $x_2$ are constant correction parameters.

Preferably, by considering the current depending factor of the threshold value, the circa 6V accuracy deviation of the voltage sensing can be reduced to a circa 1V accuracy deviation.

Figure 2:
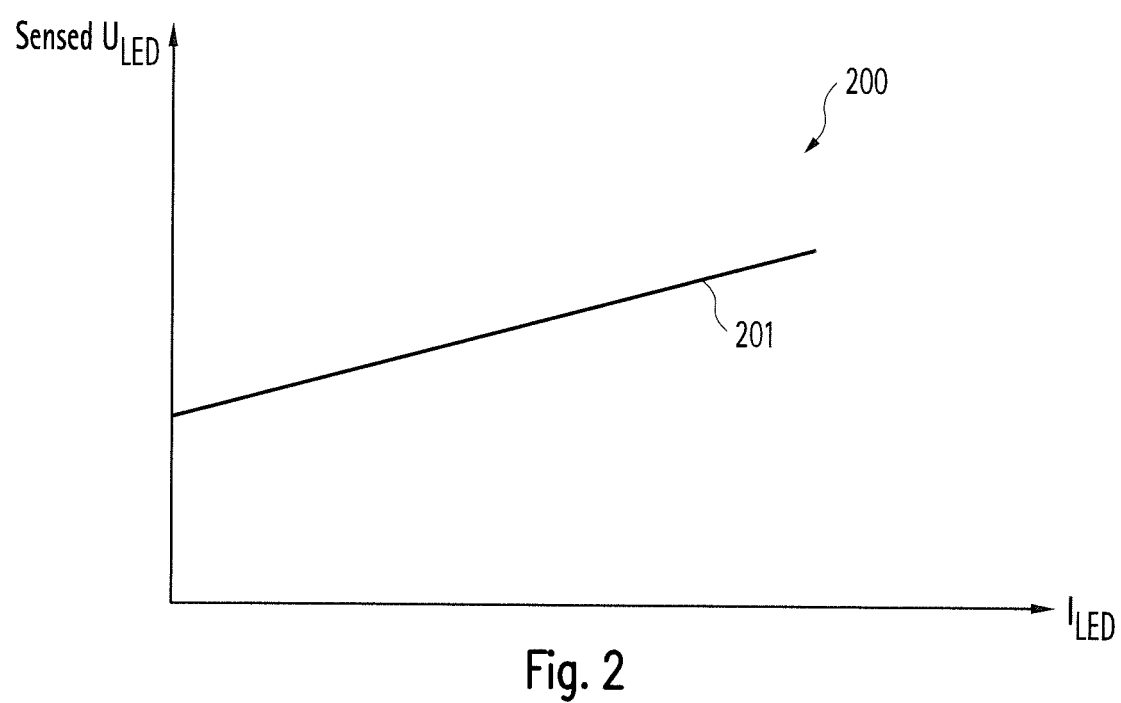
FIG. 2 shows a schematic plot of a determined LED supply voltage at different LED currents according to an embodiment.

FIG. 2 shows a schematic plot 200 of the determined LED supply voltage 201 at different LED currents according to an embodiment.

The plot 200 shows a linear deviation of the LED supply voltage with increasing LED current.

The linear function can be determined by performing at least two calibration measurements at different LED currents.

During the calibration measurement, the converter can be driven at two different load points, e.g. a first load point defined by a maximal voltage and maximal current at said voltage and a second load point defined by a maximal voltage and minimal current at said voltage. The sensed voltage at the two load points can be read out. By fitting a linear regression to the two measurement points the correction parameters $x_1$ and $x_2$ can be determined.

Preferably, these calibration measurements are performed during production of each converter. Thus, and individual adjustment factor which contains the component tolerances of the converter can be determined and later used for adjusting the threshold value. In particular, the correction parameters $x_1$ and $x_2$ represent the individual converter tolerances.

The LED current can also be adjusted in the production with two or three load points, which means that no additional adjustment point in the production is necessary.

Furthermore, the adjustment factor can comprise a temperature dependent part.

The temperature dependent part can be a linear or higher order function of the temperature.

For instance, the threshold value (Vref,comp) is calculated according to the following equation:

$$V_{ref,comp} = V_{ref} + (I_{LED} * x_1) + x_2 + x(T),$$

wherein T(X) is the temperature dependent part. In particular, T(X) is a linear equation, such as x(T)=x*T, with T being the temperature and x being a constant factor.

Alternatively, T(x) can be a higher order equation.

Furthermore, the temperature dependent part can be determined based on a look-up-table, in which different parameters for each temperature are stored.

By considering the LED converter tolerances the LED current and the ambient temperature it is possible to set the shutdown level to 57V (3V reserve to the SELV limit and 3V reserve to the maximum LED voltage) and realize a robust 54V output voltage device. By reducing the temperature dependency, it may be possible to set the shutdown level and the output voltage even higher.

For instance, the device tolerances (represented by $x_1$ and $x_2$) can cause a deviation of up to 3V, the LED current can cause a deviation of up to 6V and the ambient temperature can cause a deviation of up to 2V of the determined LED supply voltage respectively the shutdown threshold.

Figure 3:
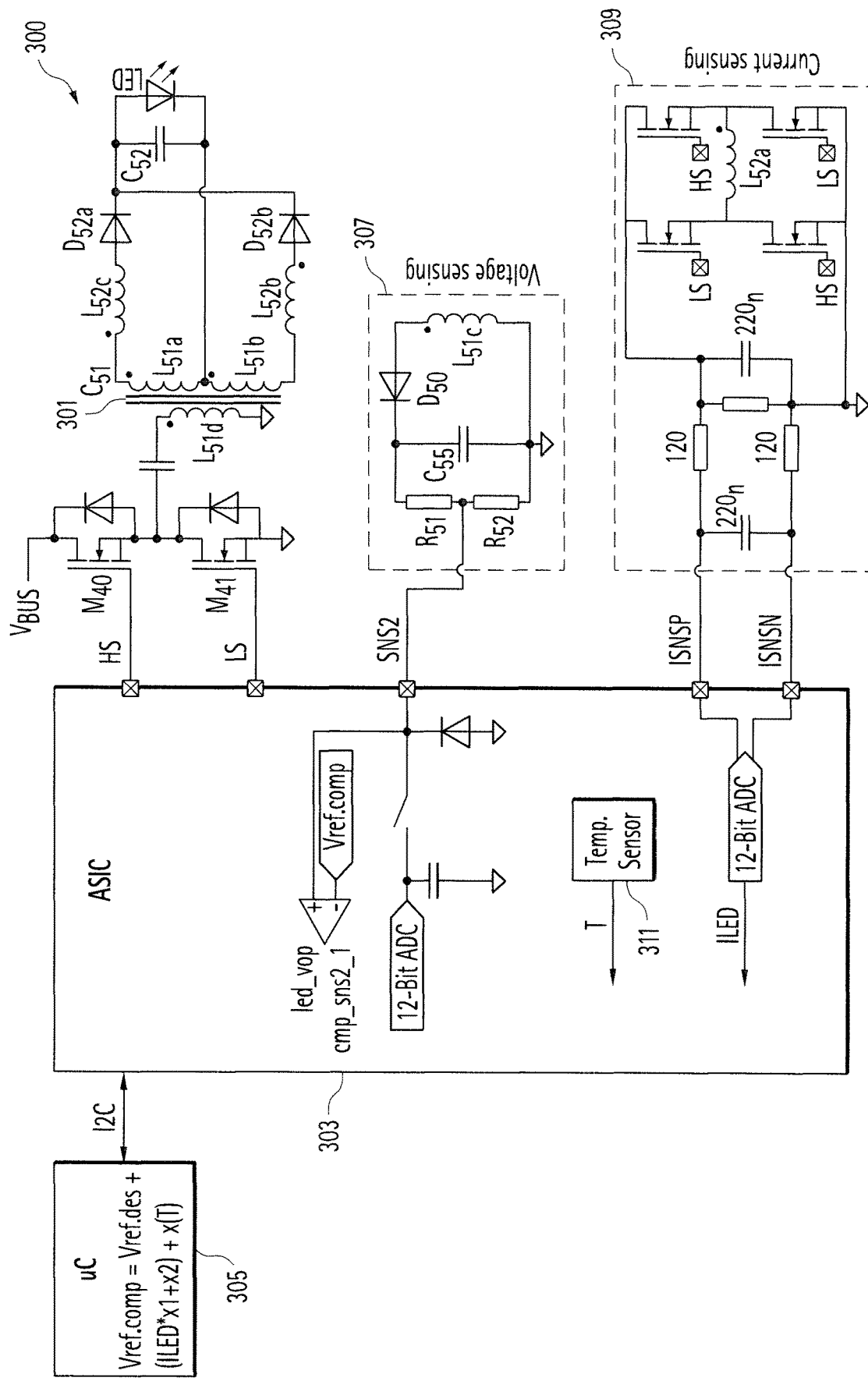
FIG. 3 shows a schematic diagram of an isolated primary side switched converter for providing a voltage supply to an LED load according to an embodiment.

FIG. 3 shows a schematic diagram of an isolated primary side switched converter 300 for providing a voltage supply to an LED load according to an embodiment.

The converter 300 comprises a galvanic isolation stage 301, an auxiliary winding L51c on the primary side of the galvanic isolation stage 301 which is magnetically coupled to at least one secondary side winding L51a, L51b, wherein the auxiliary winding L51c is configured to receive a feedback signal corresponding to a secondary side voltage, a control unit 303 configured to determine an LED supply voltage based on the feedback signal, a processing unit 305 configured to calculate a threshold value based on a constant reference voltage and an adjustment factor, wherein the adjustment factor is a dynamic factor whose absolute value increases with increasing LED current, and wherein the converter 300 is configured to interrupt the voltage supply to the LED load if the determined LED supply voltage exceeds the threshold value.

Preferably, the converter 300 comprises a transformer unit. The transformer unit can comprise a primary side winding L51d that is magnetically coupled to the at least one secondary side winding L51a, L51b. In particular, the converter is an LLC converter, a flyback converter ro a synchronous flyback converter.

Preferably, the converter 300 further comprises a switching network on the primary side of the galvanic isolation stage 301. In FIG. 3, the switching network comprises two switches M40, M41.

The converter 300 may further comprise rectification circuit on the secondary side of the isolation stage 301 comprising two diodes D52a, D52b and a capacitor C52.

Preferably, the control unit 303 is configured to the primary side switches M40, M41, in particular based on the comparison between the determined LED supply voltage and the threshold value.

In particular, the control unit 303 is configured to control the primary side switches M40, M41 to interrupt the voltage supply to the LED load if the calculated output voltage exceeds the threshold value.

In the exemplary embodiment of FIG. 3, the control unit 303 is an ASIC and the processing unit 305 is a microcontroller that is connected to the ASIC via a serial communication interface such as I2C (Inter-Integrated Circuit) or SPI (Serial Peripheral Interface).

Alternatively, the control unit 303 and the processing unit 305 could be integrated into a single unit, e.g. an ASIC or a microcontroller.

The control unit 303 can comprise a comparator which is configured to compare the LED supply voltage to the threshold value and to detect if the LED supply voltage reaches or exceeds the threshold value.

The converter 300 in FIG. 3 further comprises a voltage sensing unit 307, wherein the voltage sensing unit comprise the auxiliary winding L51c and a voltage divider having two resistances R51, R52. The voltage sensing unit 307 further comprises a diode D50 and a capacitor C55.

The voltage sensing unit 307 can be configured to pass the received feedback signal through the voltage divider and to the control unit 303 for converting the signal to a digital LED supply voltage signal.

Preferably, the converter further comprises a current sensing unit 309, which is configured to detect the LED current.

The current sensing unit 309 can comprise a further auxiliary winding L52a on the primary side of the galvanic isolation stage, which is magnetically coupled to at least one further secondary side winding L52c, L52b. The current sensing unit 309 can comprise further components, such as switches, resistors 3, 120 and conductors 220n. In particular, the current sensing unit 309 is configured to forward the detected current to the control unit 303.

The control unit 303 can comprise analog-to-digital converters (ADC), in particular a 12-Bit ADCs, to convert the detected LED supply voltage from the voltage sensing unit 307 and the detected LED current from the current sensing unit 309 to digital signals.

The control unit can further comprise a temperature sensing unit 311 for sensing an ambient temperature. The sensed temperature can be used to determine a temperature dependent part of the adjustment.

Figure 4A:
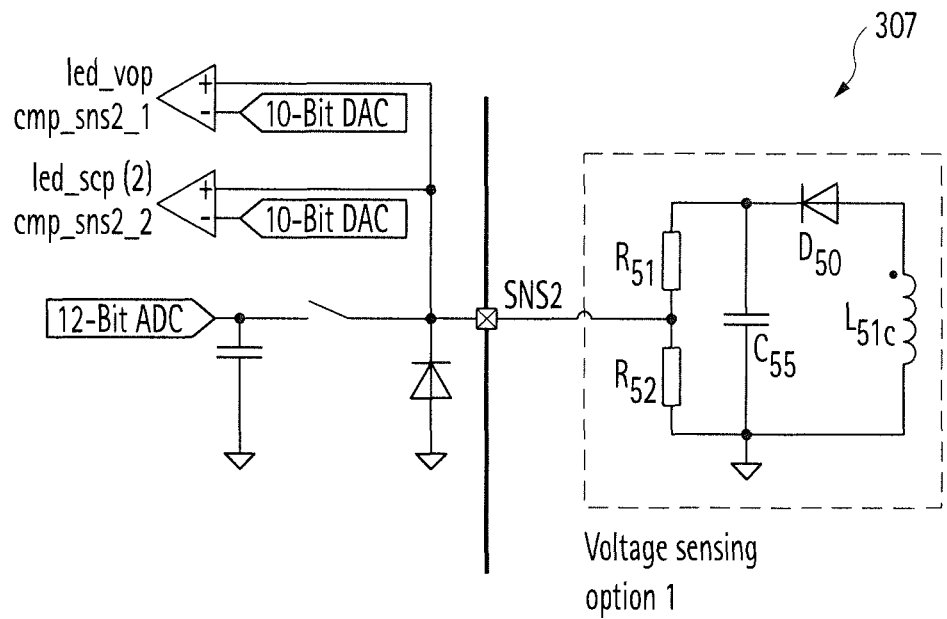
FIG. 4a-b show schematic diagrams of voltage sensing units according to two different embodiments.
Figure 4B:
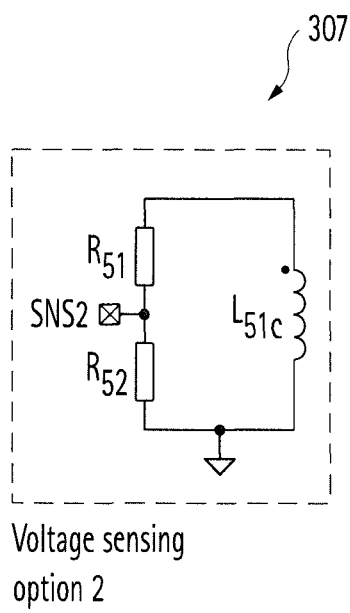

FIGS. 4a and 4b show schematic diagrams of voltage sensing unit 307 according to two different embodiments.

The voltage sensing unit 307 in FIG. 4a uses a discrete peak and hold and comprises a voltage divider having two resistances R51 and R52 as well as a capacitor C55 and a diode 50.

The voltage sensing unit 307 in FIG. 4b, in contrast, comprises the resistances R51 and R52, but not the capacitor C55 and the diode 50. Thus, the voltage sensing unit 307 in FIG. 4b has a simpler structure.

Figure 5:
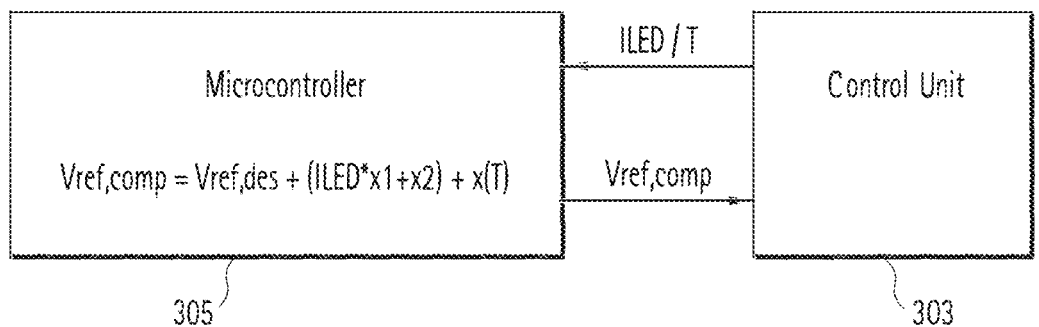
FIG. 5 shows a schematic diagram of a control unit and a processing unit of a converter according to an embodiment.

FIG. 5 shows a schematic diagram of the control unit 303 and the processing unit 305 of the converter according to an embodiment.

In FIG. 5, the control unit 303 is an ASIC and is configured to supply the detected LED current $I_{LED}$ and temperature T to the processing unit 305. The processing unit is a microcontroller, and is configured to calculate the threshold value ($V_{ref,comp}$).

Preferably, the procedure to set the threshold value comprising the following steps:
1. Read out (e.g. via I2C connection between microcontroller and the ASIC) the actual temperature (T) and actual LED current (km).
2. Calculate within the microcontroller 305 a new threshold level by considering the defined threshold (constant reference value $V_{ref,des}$), the correction parameters ($x_1$ and $x_2$) and the temperature dependent part (x(T)).
3. Set (e.g. via I2C) the register of the ASIC 303 to the new threshold level.

This procedure can be performed sequentially or can be triggered by certain events, e.g. by setting another dim level, or by a certain temperature increase/decrease.

In this way, the control unit 303 can act as a comparator that compares a determined LED supply voltage to the new threshold value. If the control unit 303 detects that determined LED supply voltage exceeds the threshold value, the module which generates the half bridge signal can be disabled and the output of the LED converter 300 turned is off.

Figure 6A:
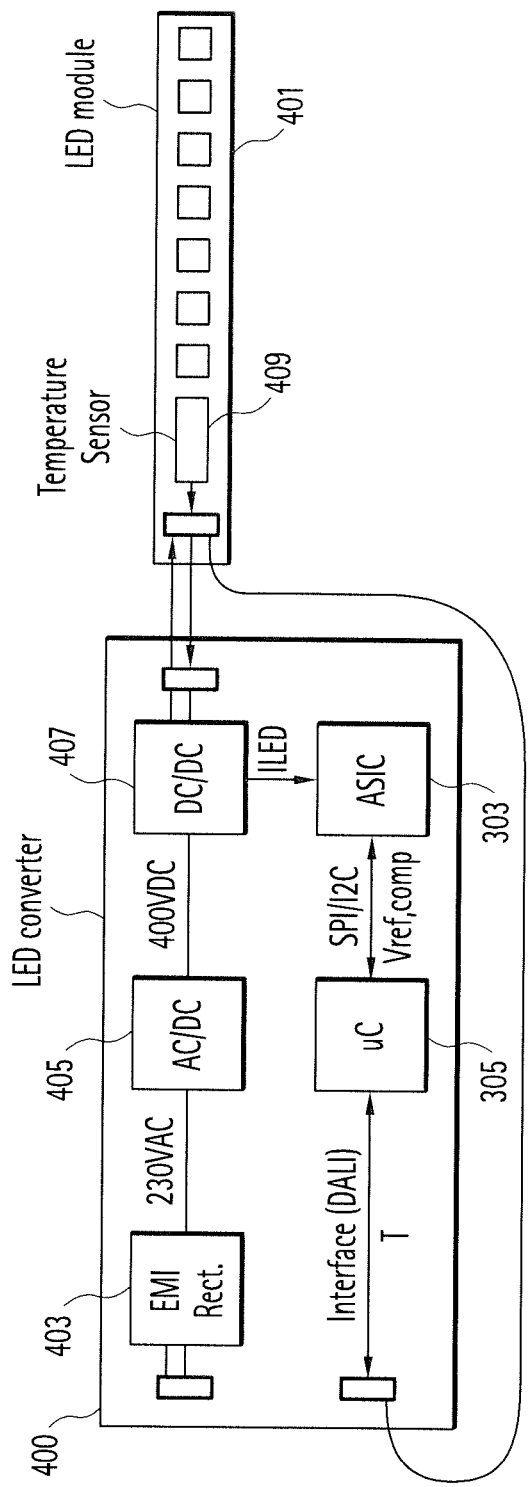
FIG. 6a shows a schematic diagram of a driver for an LED load according to an embodiment.

FIG. 6a shows a schematic diagram of a driver 400 for the LED load 401 according to an embodiment.

The LED load 401 in FIG. 6a is a LED module comprising an LED track.

The driver 400 comprises a rectifier unit 403, which forwards an AC voltage of 230V to an AC/DC converter 405. The AC/DC converter 405 supplies a DC/DC converter 407 with a DC voltage of 400V which is turned into a lower LED supply voltage by the DC/DC converter 404 and forwarded to the LED module 401.

The DC/DC converter further detects an LED current of the LED module and forwards this current to a control unit 303 in form of an ASIC, which is connected to a processing unit 305 in form of a microcontroller.

The LED module in FIG. 6a comprises an external temperature sensing unit 409, which is arranged at the LED module and configured to detect an ambient temperature.

The temperature sensor can be connected to the driver 400 via a wireless or wired communication connection, e.g. DALI or Bluetooth, for forwarding temperature measurements to the processing unit 305 to calculate the threshold value.

The DC/DC converter 407, the control unit 303 and the processing unit 305 can correspond to the converter 300 according to FIG. 3.

Figure 6B:
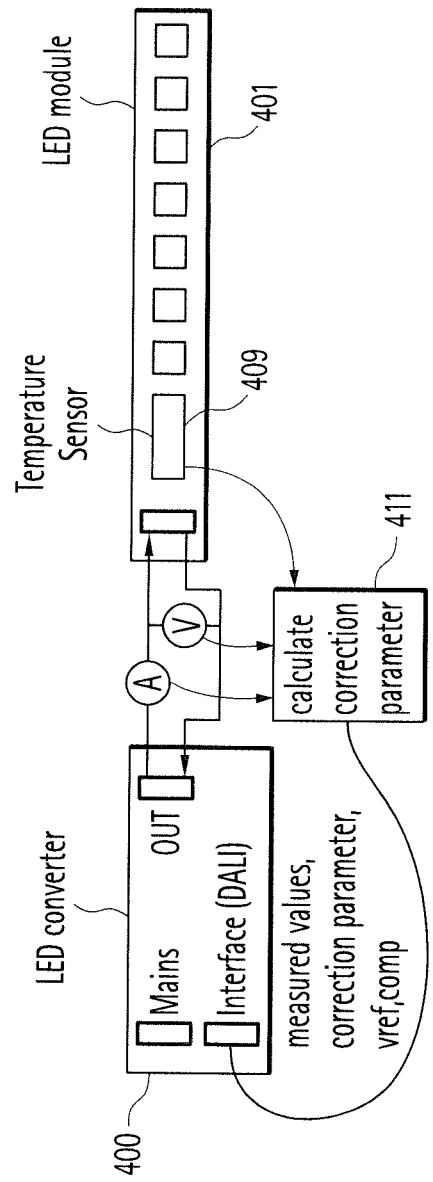
FIG. 6b shows a schematic diagram of a driver for an LED load according to an embodiment.

FIG. 6b shows a schematic diagram of the driver 400 for the LED load 401 according to an embodiment.

In FIG. 6b, an external unit 411 is configured to calculate the correction parameters $x_1$ and $x_2$, and to provide the driver 400 with these parameters, measured values or with the new calculated threshold value. This has the benefit that no specified equation for calculating the threshold has to be programmed in the processing unit 305.

Figure 6C:
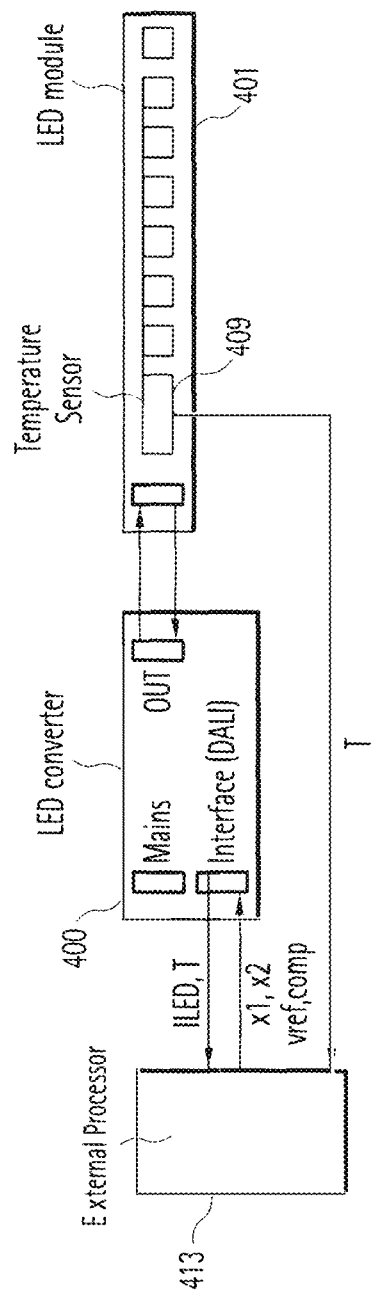
FIG. 6c shows a schematic diagram of a driver for an LED load according to an embodiment.

FIG. 6c shows a schematic diagram of the driver 400 for the LED load 401 according to an embodiment.

A similar way to the approach in FIG. 6b is illustrated in FIG. 6c. In this embodiment, the information to calculate the new threshold value of the LED voltage can be provided by the driver 400 and/or from an external logic 413 on the outside of the driver 400 (e.g. a temperature sensor on the load). Via an interface of the driver 400 (e.g. DALI) it is possible to set a new threshold value ($V_{ref,comp}$) or to update/change the correction parameter ($x_1$, $x_2$) and calculate the threshold in the internal microcontroller 305.

The driver 400 in FIGS. 6a-c can be an LED converter for converting an AC mains voltage to a voltage suitable for driving the LED load.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

The invention claimed is:

1. A method (100) for operating an isolated primary side switched converter (300) for providing a voltage supply to an LED load (401), wherein the converter comprises a galvanic isolation stage (301), the method comprising the steps of:
    detecting (101) a feedback signal at a primary side of the galvanic isolation stage (301),
    wherein the feedback signal corresponds to a secondary side voltage,
    determining (103) an LED supply voltage based on the feedback signal,
    detecting an LED current,
    calculating (105) a threshold value based on a constant reference voltage and an adjustment factor,
    wherein the adjustment factor is a dynamic factor that is repeatedly calculated based on the detected LED current while the converter is operating and whose absolute value increases with increasing LED current, and
    interrupting (107) the voltage supply to the LED load (401) if the determined LED supply voltage exceeds the threshold value.

2. The method (100) of claim 1, wherein the adjustment factor comprises a linear function of the LED current.

3. The method (100) of claim 2, wherein the linear function is determined by performing at least two calibration measurements at different LED currents.

4. The method (100) of claim 1, wherein the adjustment factor comprises a temperature dependent part.

5. The method (100) of claim 4, wherein the temperature dependent part is a linear or higher order function of the temperature, or wherein the temperature dependent part is determined based on a look-up-table.

6. An isolated primary side switched converter (300) for providing a voltage supply to an LED load (401), comprising:
    a galvanic isolation stage (301),
    a first auxiliary winding (L51c) on the primary side of the galvanic isolation stage which is magnetically coupled to at least one secondary side winding (L51a, L51b),
    wherein the first auxiliary winding (L51c) is configured to receive a feedback signal corresponding to a secondary side voltage,
    a current sensor unit configured to detect the LED current,
    a control unit (303) configured to determine an LED supply voltage based on the feedback signal,
    a processing unit (305) configured to calculate a threshold value based on a constant reference voltage and an adjustment factor,
    wherein the adjustment factor is a dynamic factor that is repeatedly calculated based on the detected LED current while the converter is operating and whose absolute value increases with increasing LED current, and wherein the converter (300) is configured to interrupt the voltage supply to the LED load if the determined LED supply voltage exceeds the threshold value.

7. The converter (300) of claim 6, wherein the current sensing unit (309) comprises a further auxiliary winding (L52a) on the primary side of the galvanic isolation stage (301), which is magnetically coupled to at least one further secondary side winding (L52c, L52b).

8. The converter (300) of claim 6, wherein the converter (300) comprises a temperature sensing unit (311, 409) for sensing an ambient temperature, wherein the adjustment factor comprises a temperature dependent part.

9. The converter (300) of claim 8, wherein the temperature sensing unit (311, 409) is arranged at the LED load (401) and is connected to the processing unit (305) via a communication interface, in particular a DALI or a Bluetooth interface.

10. The converter (300) of claim 6, wherein the control unit (303) is configured to control at least one primary side switch (M40, M41) of the converter.

11. The converter (300) of claim 6, wherein the control unit is configured to interrupt the voltage supply to the LED load (401) if the calculated output voltage exceeds the threshold value.

12. The converter (300) of claim 10, wherein the control unit (303) comprises an ASIC and/or wherein the processing unit (305) comprises a microcontroller.

13. A driver (400) for light sources, in particular LEDs, comprising the isolated primary side switched converter (300) according to claim 7.

* * * * *